United States Patent [19]

Brack

[11] 3,980,651

[45] Sept. 14, 1976

[54] WATER-INSOLUBLE BARBITURIC ACID-SUBSTITUTED NAPHTHALACTAM DYESTUFF

[75] Inventor: Alfred Brack, Odenthal, Germany

[73] Assignee: Bayer Aktiengesellschaft, Leverkusen, Germany

[22] Filed: Aug. 8, 1974

[21] Appl. No.: 495,904

[30] Foreign Application Priority Data

Aug. 17, 1973 Germany............................ 2341657

[52] U.S. Cl.............................. 260/256.4 C; 8/1 D; 8/21 C; 8/159; 8/148; 8/DIG. 4; 260/256.5 R; 260/256.5 B; 260/257
[51] Int. Cl.².............. C07D 239/10; C07D 403/04
[58] Field of Search ............. 260/256.4 C, 256.5 B, 260/256.5 R

[56] References Cited
UNITED STATES PATENTS

| | | | |
|---|---|---|---|
| 3,621,023 | 11/1971 | Padmanathan............... | 260/256.4 C |
| 3,661,907 | 5/1972 | Padmanathan............... | 260/256.4 C |
| 3,669,985 | 6/1972 | Padmanathan............... | 260/256.4 C |

*Primary Examiner*—Nicholas S. Rizzo
*Assistant Examiner*—James H. Turnipseed
*Attorney, Agent, or Firm*—Plumley and Tyner

[57] ABSTRACT

Dyestuffs of the formula

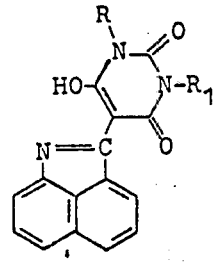

R = alkyl, alkenyl, aralkyl, cycloalkyl or aryl and
$R_1$ = alkyl with at least 4 C atoms, alkenyl, aralkyl, cycloalkyl or aryl as well as their preparation and their use for the dyeing of preferably polyester fibers in yellow shades. The dyeings show good fastness properties.

9 Claims, No Drawings

WATER-INSOLUBLE BARBITURIC ACID-SUBSTITUTED NAPHTHALACTAM DYESTUFF

The present invention relates to practically water-insoluble dyestuffs which in one of the possible tautomeric forms correspond to the formula

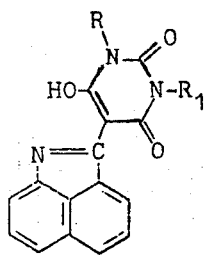

(I)

wherein
R denotes alkyl, alkenyl, aralkyl, cycloalkyl or aryl and
$R_1$ denotes alkyl with at least 4 C atoms, alkenyl, aralkyl, cycloalkyl or aryl and
the naphthalene ring and the radicals R and $R_1$ can contain non-ionic substituents and/or carboxyl groups and to their preparation and use.

Within the scope of the present invention, "non-ionic substituents" are to be understood as radicals customary in dyestuff chemistry, which do not confer solubility in water.

As examples there may be mentioned: $C_1$–$C_4$-alkoxy groups, such as methoxy, ethoxy, n- and iso-propoxy, butoxy, β-methoxyethoxy, β-cyanoethoxy and allyloxy groups; halogen atoms, such as fluorine, chlorine and bromine; amino groups, and also amino groups substituted by $C_1$–$C_4$-alkyl, aryl, acyl or benzyl, such as acetylamino, methylsulphonylamino, phenylsulphonylamino, dimethylamino, phenylamino and benzylamino groups; sulphonyl groups, such as methylsulphonyl and phenylsulphonyl groups; carboxylic acid derivatives, such as methoxycarbonyl, ethoxycarbonyl, carbamoyl and nitrile groups and (on rings) $C_1$–$C_4$-alkyl groups, such as are, for example, mentioned later for R.

Preferably, the naphthalene radical and the radicals R and $R_1$ are unsubstituted or monosubstituted by these non-ionic substituents.

Suitable alkyl radicals R are those with 1 to 6 C atoms, such as the methyl, ethyl, n- and iso-propyl, n-, iso- and tertiary-butyl, n- and iso-amyl, neo-pentyl and n-hexyl radical, and also $CF_3$, γ-chloropropyl, β-cyanoethyl and others.

Suitable alkyl radicals $R_1$ are those with 4 to 6 C atoms, such as are mentioned above.

Suitable alkenyl radicals R and $R_1$ are those with 3 to 6 C atoms, such as, for example, the allyl and 3,3-dimethylallyl radical.

Suitable cycloalkyl radicals R and $R_1$ are monocyclic and bicyclic 5-membered or 6-membered cycloalkyl radicals such as, for example, the cyclohexyl, o-, m- and p-methylcyclohexyl, 3,3,5-trimethylcyclohexyl and cyclopentyl radical and also the norbornylmethyl radical.

Suitable aralkyl radicals R and $R_1$ are phenyl-$C_1$–$C_4$-alkyl radicals, such as, for example, the benzyl, β-phenylethyl, γ-phenylpropyl and ν-phenylbutyl radical.

Examples of suitable aryl radicals R and $R_1$ are phenyl and naphthyl radicals which can optionally be substituted by Cl, F, Br, $C_1$–$C_4$-alkyl, $C_1$–$C_4$-alkoxy and others.

Preferred dyestuffs are those of the formula I wherein
R represents $C_1$- to $C_6$-alkyl or norbornylmethyl and
$R_1$ denotes a phenyl radical which is optionally substituted by Cl, Br, $C_1$–$C_4$-alkyl or $C_1$–$C_4$-alkoxy as well as those of the formula I
wherein
R represents $C_1$–$C_6$-alkyl and
$R_1$ represents $C_4$–$C_6$-alkyl
and finally those of the formula I,
wherein
R represents $C_1$–$C_6$-alkyl and
$R_1$ represents phenyl-$C_1$–$C_4$-n-alkyl and
the phenyl radical is optionally substituted by $C_1$–$C_4$-alkyl, $C_1$–$C_4$-alkoxy or chlorine and the n-alkyl radical is optionally substituted by $C_1$–$C_4$-alkyl, nitrile or chlorine.

The new dyestuffs of the formula I can be prepared according to various processes.

A preferred process is one wherein naphtholactam-1,8 (II) which is optionally nuclear-substituted by non-ionic substituents and/or carboxyl groups is condensed with comounds which in one of the possible tautomeric forms correspond to the formula

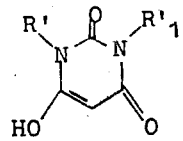

(III)

wherein
R' and $R'_1$ represent R or $R_1$ or hydrogen in the presence of phosphorus oxychloride and optionally of phosphorus pentoxide and, if R' and/or $R'_1$ denote hydrogen, the radicals R and/or $R_1$ are subsequently introduced in a manner which is in itself known. The condensation is generally carried out at elevated temperatures (50°–150°), preferably at between 80° and 120°C.

The phosphorus oxychloride is employed in at least equimolar amounts (relative to the naphtholactam). However, it preferably at the same time serves as the solvent or diluent, that is to say it is employed in an amount which suffices to make it possible to stir the reaction mixture.

The $P_2O_5$ which is advantageously added is used in amounts of 0.5 to 2 equivalents (relative to the naphtholactam).

Further, the new dyestuffs can also be prepared by a method in which compounds of the formula

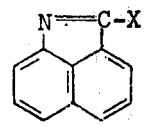

(IV)

(or its possible tautomeric forms) wherein

X represents chlorine, —SH or —S-alkyl and the naphthalene radical can be substituted by nonionic substituents and/or COOH or their salts with protic acids are condensed with compounds of the formula III.

Suitable protic acids are hydrochloric acid, sulphuric acid, formic acid, acetic acid, propionic acid and the like.

Suitable compounds (II) are: naphtholactam-(1,8), 4-methoxy-, 4-ethoxy-, 4-iso-propoxy- and 4-n-butoxy-, 4-methylmercapto-, 4-methylsulphonyl-, 4-methylsulphonylamino-, 4-acetylamino-, 4-benzoylamino-, 4-dimethylamino-, 4-methyl-, 4-iso-propyl-, 4-chloro-, 4-bromo and 4-cyano-naphtholactam-(1,8), 4,5-ethylene-naphtholactam-(1,8) (=acenaphthene-lactam), 6-hydroxy- and 6-methylamino-naphtholactam-(1,8).

Examples of suitable compounds (III) are: di-n-butyl-, di-iso-butyl-, di-N-amyl-, di-iso-amyl-, di-n-hexyl-, di-benzyl-, di-β-phenylethyl-, di-cyclohexyl-, di-phenyl-, di-p-tolyl- and di-p-methoxybenzyl-barbituric acid, N-methyl-N-n-butyl-, N-methyl-N'-benzyl-, N-methyl-N'-β-phenylethyl, N-methyl-N-γ-phenylpropyl-, N-methyl-N'-ν-phenylbutyl-, N-methyl-N'-α-isobutyl-γ-phenylpropyl-, N-methyl-N'-cyclohexyl, N-methyl-N'-phenyl, N-methyl-N'-p-tolyl- and N-methyl-N'-p-ethoxyphenyl-barbituric acid, N-methyl-N'-norbornyl-methylbarbituric acid and the corresponding N-ethyl- and N-n-butyl derivatives.

The dyestuffs according to the invention are suitable for dyeing, printing and bulk dyeing materials which consist entirely or predominantly of polyamides, polyesters, polyurethanes or polystyrene, and for the preparation of ballpoint pen pastes and for use in flexographic printing. The new dyestuffs are particularly suitable for dyeing and printing fibre materials which consist entirely or predominantly of polyesters such as of polyethylene glycol terephthalate, of the polycondensation product of 1,4-(bis-hydroxymethyl)-cyclohexane with terephthalic acid, of aromatic polycarbonates or of cellulose esters. The resulting dyeings and prints are distinguished by outstanding fastness properties, especially by good fastness to light, sublimation, flue gas, pleating, rubbing and wet processing. The new dyestuffs are very economical in use and are absorbed very effectively and evenly. They are insensitive to hydrolytic factors and are heat-resistant, and are outstandingly suitable for dyeing at temperatures above 100°C, for example at 180°C. When dyeing mixed fabrics, the wool or cotton constituents are not dyed.

The parts mentioned in the examples are parts by weight.

EXAMPLE 1

21.8 parts of 1-phenyl-3-methyl-barbituric acid and 16.9 parts of 1,8-naphtholactam are stirred with 250 parts of freshly distilled phosphorus oxychloride and 50 parts of phosphorus pentoxide for 15 hours at 110°C. After cooling, the phosphorus oxychloride is hydrolyzed by reaction with ice water (1,000 to 2,000 parts). The crude dyestuff which has separated out is filtered off and washed with water until virtually free from acid. The crude product thus obtained (33–35 parts) is recrystallized from 250 parts of dimethylformamide, with addition of 2–3 parts of active charcoal. The dyestuff of the formula

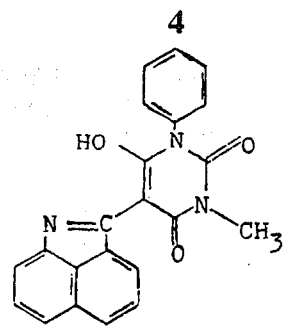

is obtained, which gives outstandingly light-fast and sublimation-fast yellow dyeings and prints, of high color saturation, on polyester.

1-Phenyl-3-methyl-barbituric acid was prepared by condensation of malonic acid diethyl ester with phenylmethylurea in methanol, with addition of sodium methylate. It melts at about 124°C after recrystallization from toluene.

If instead of 1,8-naphtholactam its 4-chloro or 4-bromo derivative is used, the dyestuffs of the corresponding structure are obtained, which dye polyester in a strongly yellowish-tinged orange of outstanding fastness to light and to sublimation.

EXAMPLE 2

30.8 parts of 1,3-dibenzyl-barbituric acid, 16.9 parts of 1,8-naphtholactam, 200 parts of phosphorus oxychloride and 20 parts of phosphorus pentoxide are stirred for 25 hours at 100°C. The mixture is worked up in accordance with the instructions of Example 1. The dyestuff, which is obtained in 90–95% yield, was purified by recrystallization from 500 parts of toluene. It corresponds to the formula

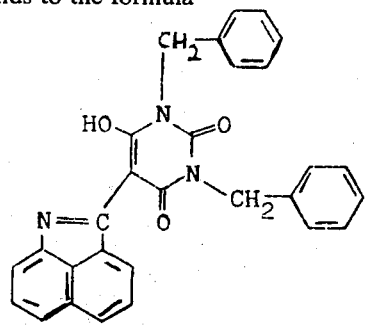

The yellow dyeings and prints on polyester materials are distinguished by very good fastness to light and to sublimation.

If instead of dibenzylbarbituric acid the equivalent amount of 1-methyl-3-p-chlorophenyl-, 1-methyl-3-p-bromophenyl-, 1-methyl-3-3',4'-dichlorophenyl-, 1-n-butyl-3-p-tolyl-, 1-n-butyl-3-p-methoxyphenyl-, 1-methyl-3-3',4'-di-methoxyphenyl-, 1-methyl-3-p-cyanophenyl-, 1-methyl-3-p-fluorophenyl-, 1-methyl-3-n-butyl-, 1-methyl-3-iso-butyl-, 1-methyl-3-n-hexyl-, 1,3-di-n-butyl-, 1,3-di-iso-amyl-, 1,3-di-n-hexyl- or 1-methyl-, 1-ethyl-, 1-isopropyl-, 1-n-butyl- or 1-β-cyanoethyl-3-benzylbarbituric acid is used, very fast yellow dyestuffs of corresponding structure are again obtained.

EXAMPLE 3

123 parts of 1-methyl-3-β-phenylethylbarbituric acid are stirred with 85 parts of naphtholactam, 1,000 parts of phosphorus oxychloride and 380 parts of phosphorus pentoxide for 15 hours, whilst gently boiling under reflux. The resulting mixture is poured in 10,000 parts of ice water. After completion of hydrolysis of the condensation agent, the crude dyestuff of the formula

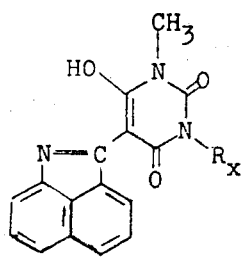

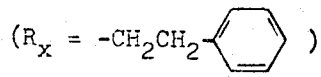

which is obtained as a brown powder, is isolated and washed with water until virtually free of acid. It can be recrystallized, for example from dimethylformamide. The yellow dyeings and prints on polyester materials are distinguished by outstanding fastness properties.

If instead of 1-methyl-3-β-phenylethylbarbituric acid the equivalent amount of 1-methyl-3-γ-chloro-, -3-γ-phenyl- or 1-methyl-3-α-iso-butyl-γ-phenyl-propyl-barbituric acid is used, the yellow dyestuffs of corresponding structure, that is to say, $R_x$ = —CH$_2$CH$_2$CH$_2$Cl,

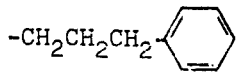

and

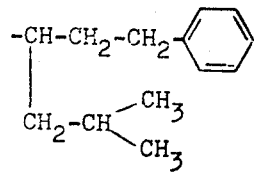

which are tinctorially also very valuable are obtained. Equally, valuable new dyestuffs are obtained when the corresponding 1-n-butylbarbituric acids are used.

EXAMPLE 4

A dyebath consisting of 0.1 part of the well-dispersed dyestuff of the formula

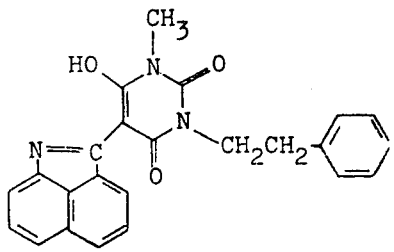

2.0 parts of o-phenylphenol or of an equivalent amount of another dyeing accelerator, for example a chlorinated benzenehydrocarbon, salicylic acid ester or cresotic acid ester and 400 parts of water is adjusted to a pH value of 4–5 with sulphuric acid and 10 parts of polyethylene glycol terephthalate fibres are introduced whilst the bath is at 30°–40°C. The bath is heated to the boil over the course of about 30 minutes whilst agitating the fibre material and is kept at the boil for one hour. After rinsing and drying, a brilliant yellow dyeing of very good fastness to light, washing and sublimation is obtained.

EXAMPLE 5

Ready-to-print polyester fabric is printed with a printing paste of the following composition: 5–10 parts of the dyestuff of the formula

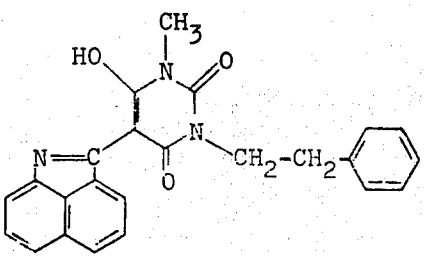

50 parts of thiodiethylene glycol
500 parts of alginate thickener
15 parts of cresotic acid ester
20 parts of Monopol Brilliant oil
405–410 parts of water
1,000 parts The dyestuff is fixed either by steaming at about 100°C or by brief dry heating to about 200°C. The fabric is then rinsed cold, soaped for about 10 minutes at about 70°–80°C, rinsed first hot and then cold, and dried. A brilliant yellow print of outstanding fastness to light, washing, sublimation and rubbing is obtained.

The composition of the printing paste used can be suitably modified without the quality of the prints produced therewith suffering. Thus, for example, crystal gum can be used instead of alginate thickener, or the cresotic acid ester can be replaced by another dyeing accelerator.

EXAMPLE 6

0.2 part of the well-dispersed dyestuff of the formula

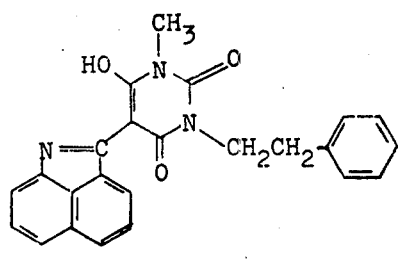

are stirred with 2 parts of water and 2–3 parts of salicylic acid ester or cresotic acid ester at about 20°C. 400 parts of water and sufficient formic acid are added to give a pH value of between 4.5 and 5, the mixture is warmed to approx. 50°C and 10 parts of cellulose triacetate fibres are introduced into the bath. The temperature is raised to 98°C over the course of 20 minutes whilst drawing the fibres through the bath, and the dyebath is held at between 98°C and the boil for 1–1½ hours. After rinsing and drying, an outstandingly fast yellow dyeing is obtained.

I claim:

1. A compound which in one of its possible tautomeric forms corresponds to the formula

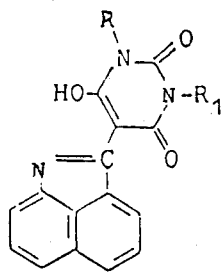

R is $C_1$–$C_6$-alkyl, $CF_3$, $C_3$–$C_6$-alkenyl, cyclohexyl, 3,3,5-trimethylcyclohexyl, cyclopentyl, norbornylmethyl, p-methoxybenzyl, phenyl-$C_1$–$C_4$-alkyl, phenyl, or napthyl;

$R_1$ is $C_4$–$C_6$-alkyl, $C_3$–$C_6$-alkenyl, cyclohexyl, 3,3,5-trimethylcyclohexyl, cyclopentyl, norbornylmethyl, p-methoxybenzyl, phenyl-$C_1$–$C_4$-alkyl, phenyl, or napthyl;

and wherein R, $R_1$ and the napthalone ring in the above formula are unsubstituted or monosubstituted with $C_1$–$C_4$-alkoxy, fluorine, chlorine, hydroxy, cyano, bromine, amino, amino substituted with $C_1$–$C_4$-alkyl, acetylamino, methylsulfonylamino, phenylsulfonylamino, dimethylamino, phenylamino, benzoylamino, benzylamino, β-methoxyethoxy, β-cyanoethoxy, methylsulfonyl, phenylsulfonyl, methoxycarbonyl, ethoxycarbonyl, carbamoyl, nitrile, or, on rings, $C_1$–$C_4$-alkyl.

2. Compound of claim 1 wherein
R is $C_1$–$C_6$-alkyl or norbornylmethyl; and
$R_1$ is phenyl unsubstituted or monosubstituted with chlorine, bromine, $C_1$–$C_4$-alkyl, or $C_1$–$C_4$-alkoxy.

3. Compound of claim 1 wherein
R is $C_1$–$C_6$-alkyl; and
$R_1$ is $C_4$–$C_6$-alkyl.

4. Compound of claim 1 wherein
R is $C_1$–$C_6$-alkyl; and
$R_1$ is phenyl-$C_1$–$C_4$-n-alkyl wherein the phenyl radical is unsubstituted or monosubstituted with $C_1$–$C_4$-alkyl, $C_1$–$C_4$-alkoxy, or chlorine, and the n-alkyl radical is unsubstituted or monosubstituted with $C_1$–$C_4$-alkyl, nitrile or chlorine.

5. Compound according to claim 1, wherein
R represents methyl and
$R_1$ represents n-butyl.

6. Compound according to claim 1, wherein
R and $R_1$ represent n-butyl.

7. Compound according to claim 1, wherein
R and $R_1$ represent iso-amyl.

8. Compound according to claim 1, wherein
R represents methyl and
$R_1$ represents β-phenylethyl.

9. Compound according to claim 1, wherein
R represents n-butyl and
$R_1$ represents β-phenylethyl.

* * * * *